United States Patent [19]

Carvalho

[11] 4,345,587
[45] Aug. 24, 1982

[54] SOLAR ENERGY COLLECTOR MEANS AND METHOD OF ASSEMBLING THE SAME

[75] Inventor: Elmer R. Carvalho, Claremont, Calif.

[73] Assignee: D G Shelter Products Company, City of Industry, Calif.

[21] Appl. No.: 95,623

[22] Filed: Nov. 16, 1979

[51] Int. Cl.³ .............................................. F24J 3/02
[52] U.S. Cl. ................................ 126/450; 126/417; 126/446; 126/452; 52/172
[58] Field of Search ............... 126/417, 450, 432, 446; 52/172, 173; 165/76

[56] References Cited

U.S. PATENT DOCUMENTS

| | | | |
|---|---|---|---|
| 1,125,113 | 1/1915 | Junkers | 165/171 |
| 3,025,851 | 3/1962 | Steinberg | 126/451 |
| 3,039,453 | 6/1962 | Andrassy | 126/450 X |
| 3,464,402 | 9/1969 | Collura | 126/447 |
| 3,929,121 | 12/1975 | Rogers | 126/424 X |
| 3,937,208 | 2/1976 | Katz et al. | 126/450 X |
| 3,952,725 | 4/1976 | Edmondson | 126/447 |
| 3,990,429 | 11/1976 | Mazzoni et al. | 126/450 |
| 3,991,531 | 11/1976 | Becker | 52/172 X |
| 3,995,614 | 12/1976 | Cerra et al. | 126/450 |
| 3,999,536 | 12/1976 | Bauer et al. | 126/450 |
| 4,011,856 | 3/1977 | Gallagher | 126/446 |
| 4,027,652 | 6/1977 | Collura | 126/446 |
| 4,098,259 | 7/1978 | Barber, Jr. et al. | 126/450 X |
| 4,164,935 | 8/1979 | Marles et al. | 126/447 |
| 4,167,178 | 9/1979 | Brussels | 126/450 X |
| 4,201,190 | 5/1980 | Bowen | 126/450 |
| 4,231,204 | 11/1980 | Krueger et al. | 126/450 X |

FOREIGN PATENT DOCUMENTS

| | | | |
|---|---|---|---|
| 2522154 | 11/1976 | Fed. Rep. of Germany | 126/446 |
| 2702313 | 7/1978 | Fed. Rep. of Germany | 126/450 |
| 938012 | 9/1963 | United Kingdom | 126/446 |

*Primary Examiner*—Larry Jones
*Attorney, Agent, or Firm*—Poms, Smith, Lande & Rose

[57] ABSTRACT

A solar energy collector means comprising a rectangular frame, a back wall of thin sheet material bonded and sealed at its margins to said frame, a light transmitting plate bonded and sealed to said frame in spaced relation to said back wall to provide a rigid structure, a solar energy absorber and coil means located between said back wall and said plate, a blanket of insulating material between said absorber coil assembly and said back wall, and means for laterally and longitudinally positioning said solar energy absorber and coil means with respect to said frame without metal-to-metal contact between said frame, back wall, and said absorber means, and whereby said solar absorber and coil means is limitedly floatable on said insulating blanket and adapted to expand and contract without stressing said frame. A solar collector provided with removable breathing desiccant means supported within said frame on said absorber means. An adjustable mounting means for optimum inclination of said collector with respect to reception of solar energy. A method of assembling a solar collector for providing thermal isolation of the internal solar absorber and coil means within the receptacle adapted to receive solar energy with respect to a frame and back wall in contact with ambient temperature.

15 Claims, 13 Drawing Figures

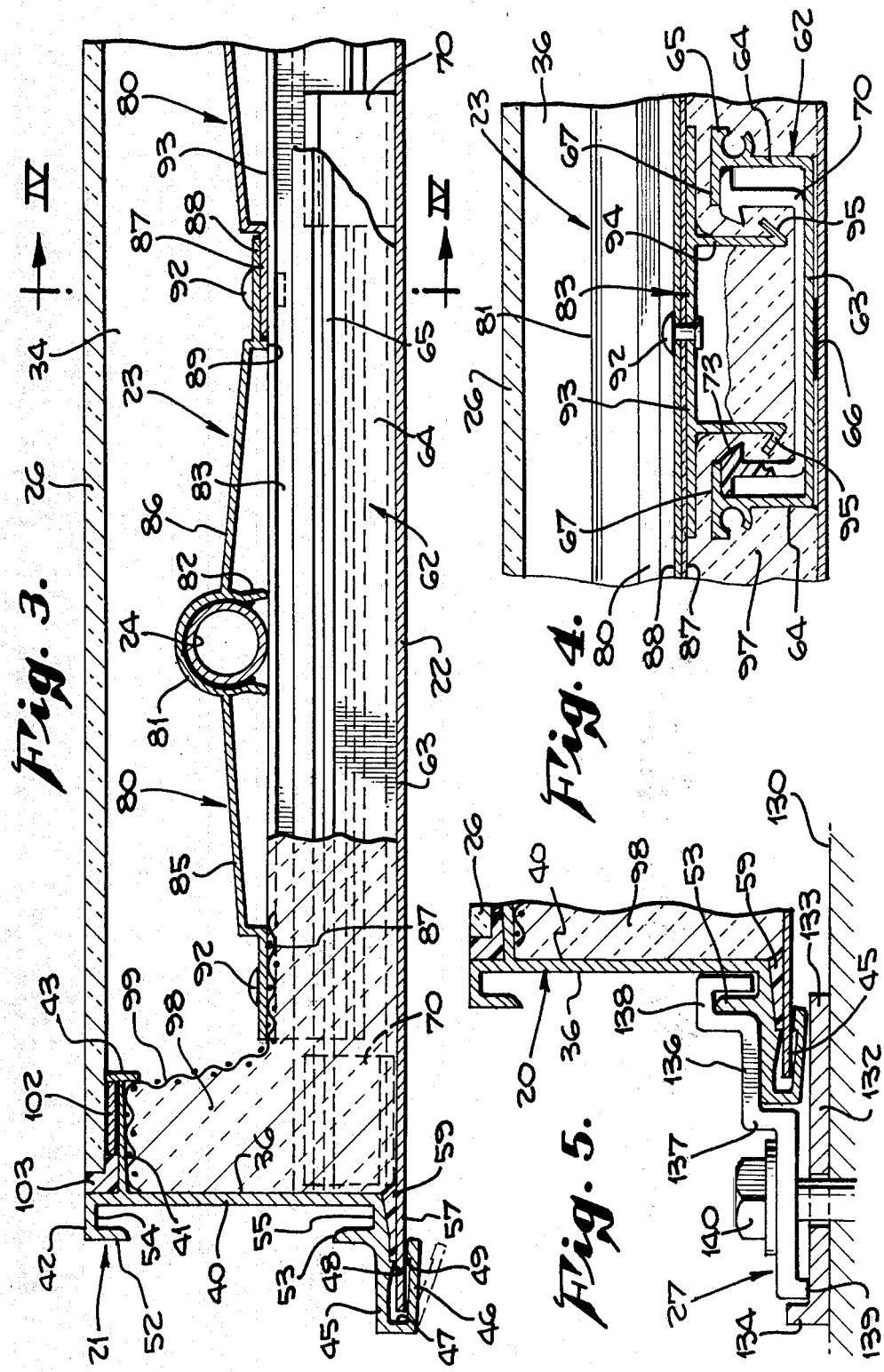

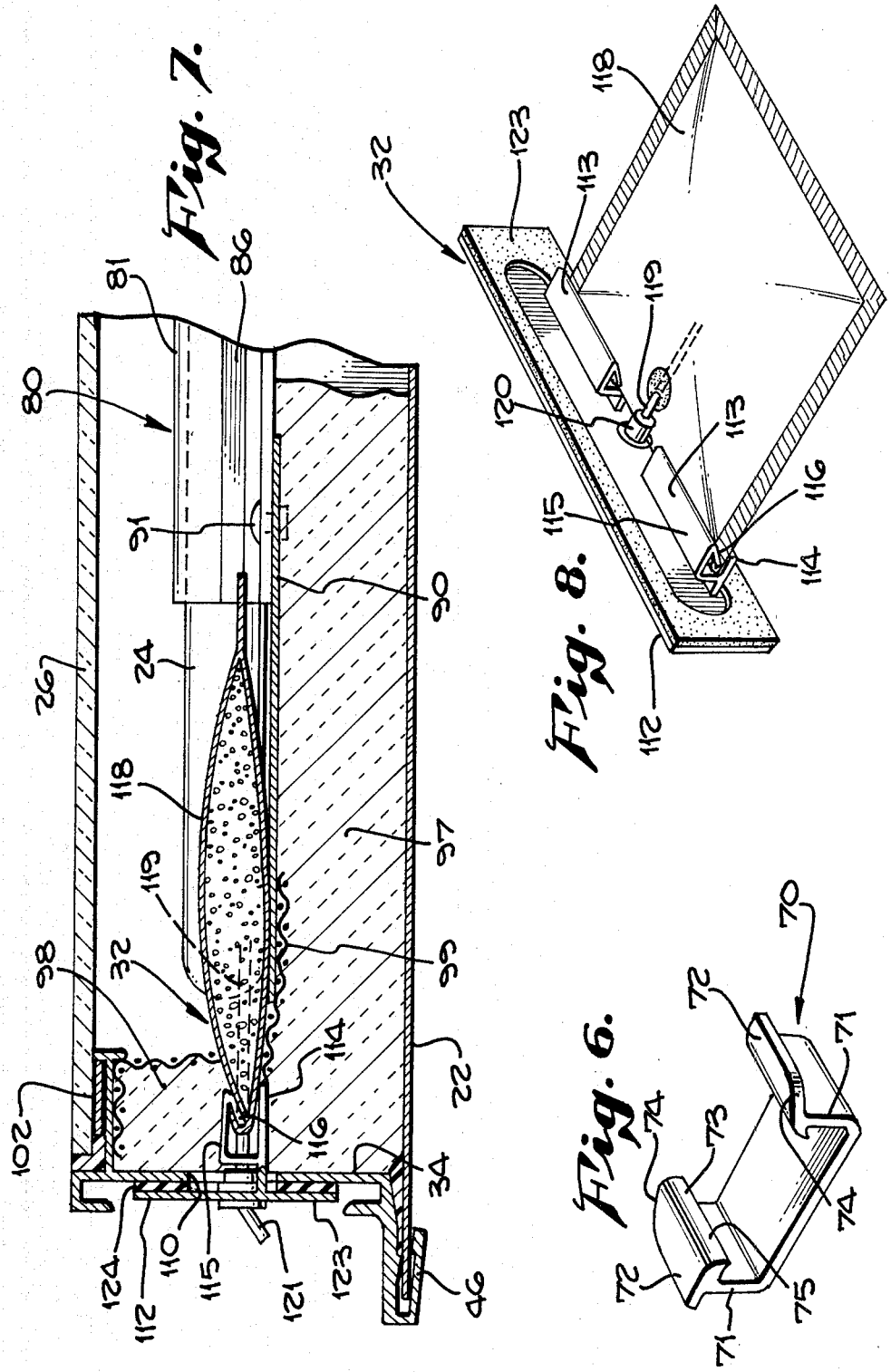

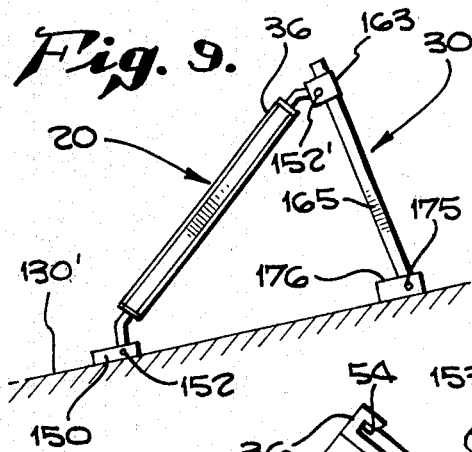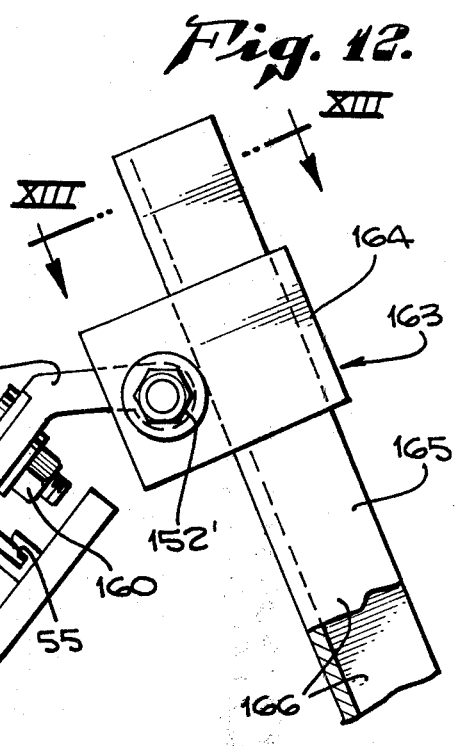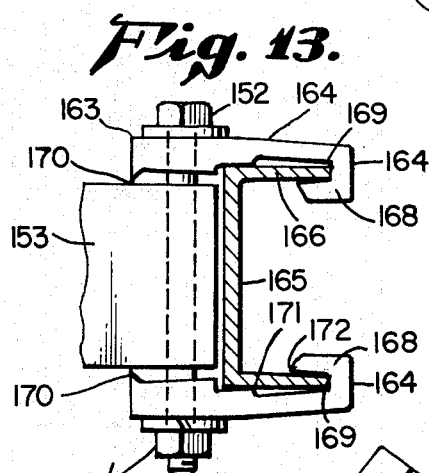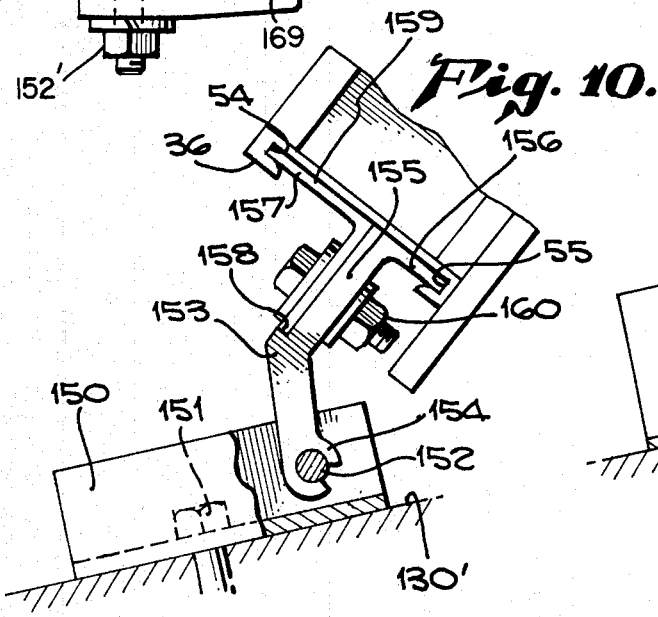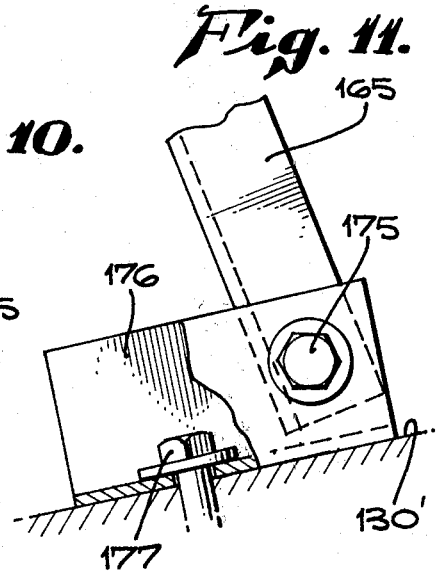

SOLAR ENERGY COLLECTOR MEANS AND METHOD OF ASSEMBLING THE SAME

BACKGROUND OF THE INVENTION

This invention generally relates to solar energy collectors in which fluid flowing through a continuous tube is heated by contact with a means for absorbing solar energy as a result of sun's rays falling on the absorber means and passing through a light transmitting plate.

There have been numerous types of solar energy collectors embodying this general concept. Such prior proposed collector constructions have had advantageous and disadvantageous features. In general the problems sought to be solved by such prior solar collector have included the provision of a sufficiently rigid structure adapted to be readily assembled and fabricated while remaining inexpensive, the preservation as long as possible of the light transmitting function of the collector so that the transmission of solar energy to a solar absorber means is as effective as possible, compensation in the structure for expansion and contraction of different materials and under a wide temperature range such as occurs between night and day and wherein during the day certain portions of the collector may reach temperatures of 350 degrees F. and more, the maintenance of a clear nonhumid atmosphere within a substantially sealed solar collector receptacle, a method of readily assembling a solar collector structure, and the provision of a most effective, efficient thermal conductivity between solar energy absorber plates and fluid carried in a continuous tube.

Some previous types of solar collectors are shown generally in U.S. Pat. Nos. 938,012; 1,125,113; 3,039,453 and 3,464,402.

Prior proposed solar collectors utilizing a thermal conductive material between a fluid carrying tube and solar energy absorber plates are disclosed in U.S. Pat. Nos. 3,952,725 and 4,027,652. Prior solar collectors have also employed desiccant material within a collector construction as disclosed in U.S. Pat. Nos. 3,990,429, 3,995,614 and 3,999,536.

SUMMARY OF INVENTION

The present invention relates to a novel solar energy collector and method of assembling the same whereby an efficient, effective transfer of solar energy absorbed by a solar collecting means is transferred to a fluid such as water.

The present invention particularly contemplates a solar collector having a composite, rigid structure utilizing the general principles of "stress-skin" design whereby upon completion of the assembly of the solar collector stresses imparted to the collector because of installation and because of changes in temperature resulting in contraction and expansion are effectively resisted and withstood by the novel assembly of a light transmitting plate, receptacle frame members of a selected extruded aluminum section, and a back wall of aluminum sheet material. The invention further contemplates a solar energy absorber means comprising a plurality of black-coated aluminum blades and a continuous copper coil arranged to be snapped and assembled with the receptacle formed by the frame without metal-to-metal contact and wherein the solar energy absorber assembly is adapted to float within the collector to isolate expansion and contraction of the absorber means. The invention further contemplates the use of structural glazing comprising a silicone adhesive sealant for bonding edges of the glassplate to the aluminum metal frame without other retaining and fastening means. The invention further contemplates the use of thermal conductive material between the aluminum solar energy collector blades and a copper tube for passage of fluid wherein the thermal conductive material also serves as a dielectric separator to inhibit reaction between the two different types of metal. The invention also contemplates a removable desiccant means with a breather tube which permits communication of ambient air and interior air within the receptacle through a desiccant material so as to maintain the interior of the collector substantially free of foreign matter such as dust and of humidity which may cloud the light transmitting plate and adversely effect transmission of solar energy.

It is, therefore, a primary object of the present invention to disclose a solar energy collector of novel construction and method of assembly.

An object of the invention is to disclose and provide a solar collector so constructed and arranged that structural adhesive sealant compounds may be readily used to provide a rigid stress resistant collector receptacle.

Another object of the present invention is to disclose a solar collector construction wherein assembly of an interior solar absorber and coil assembly is facilitated and in which transmission of heat between the solar absorber means and the exterior receptacle frame is minimized.

A still further object of the invention is to disclose a solar collector in which the exterior surface of the light transmitting plate is protected temporarily during installation and until the collector becomes operable and active.

A still further object of the invention is to provide a solar energy collector having frame members adapted to be readily connected to mounting means for fixed or adjustable installations.

Many other objects and advantages of the present invention will be readily apparent from the following description of the drawings in which exemplary embodiments of the invention are shown.

DESCRIPTION OF DRAWINGS

FIG. 3 is an enlarged fragmentary sectional view taken in the vertical plane indicated by line III—III of FIG. 1.

FIG. 4 is a fragmentary sectional view taken in the vertical plane indicated by line IV—IV of FIG. 3.

FIG. 5 is an enlarged fragmentary sectional view taken in the plane indicated by line V—V of FIG. 1.

FIG. 6, is a perspective view of an insulating clip member used in the receptacle frame assembly.

FIG. 7 is an enlarged fragmentary sectional view taken in the vertical plane as indicated by line VII—VII of FIG. 1.

FIG. 8 is a perspective view of a removable desiccant package shown in FIG. 7.

FIG. 9 is a schematic view of a solar collector panel adjustably mounted on a roof or other supporting surface.

FIG. 10 is an enlarged fragmentary view partly in section of a mounting bracket for the solar collector.

FIG. 11 is a fragmentary side elevation partly in section of a strut mounting bracket.

FIG. 12 is an enlarged fragmentary elevational view of slidably adjustable bracket interconnecting a strut and the solar collector.

FIG. 13 is a fragmentary sectional view taken in the plane indicated by line XIII—XIII of FIG. 12.

DETAILED DESCRIPTION

Figure 1:
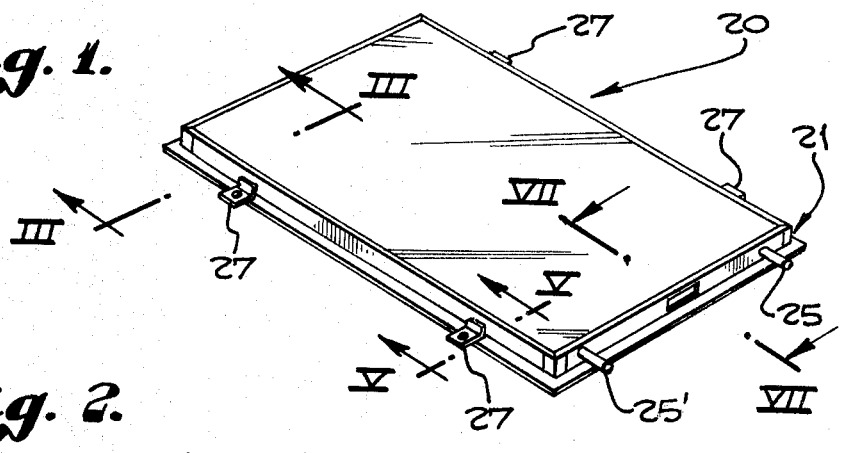
FIG. 1 is a perspective view of a solar collector embodying this invention.
Figure 2:
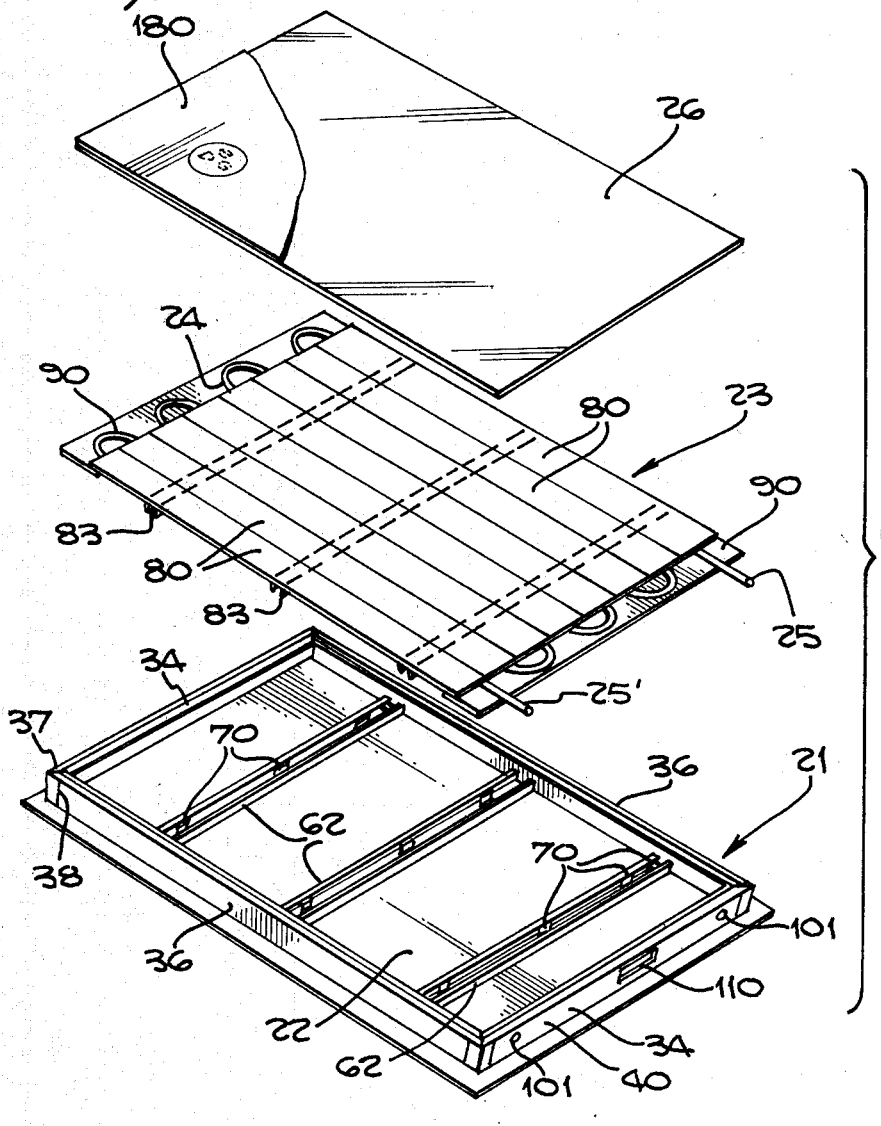
FIG. 2 is an exploded perspective view of the solar collector shown in FIG. 1, and illustrating major components thereof, namely, a receptacle frame assembly, a solar absorber and coil assembly, and a light transmitting plate.

A solar collector 20 embodying this invention is generally and schematically indicated in FIGS. 1 and 2. Solar collector 20 generally comprises a rectangular frame 21 having a back wall 22. Within frame 21 a solar absorber and coil assembly 23 is supported, said assembly including a continuous tube 24 havings ends 25 and 25' extending outwardly from frame 21. Supported by frame 21 is a plate 26 of light transmitting material bonded to the frame 21 as hereinafter described. Frame 21 carries mounting brackets 27 for securing the solar collector to a suitable roof or supporting surface. In one type of installation as shown in FIGS. 9–13 inclusive, the solar collector 20 is supported by adjustable bracket means 30 for selecting optimum inclination of the collector with respect to the path of the sun. A desiccant breathing device generally indicated at 32, FIGS. 7 and 8, is provided in the collector to demoisturize the interior of the collector and to permit breathing between the collector interior and exterior ambient air.

In detail and referring particularly to FIG. 3, the rectangular frame 21 comprises end and side frame members 34 and 36 respectively, each member 34 and 36 being an extruded aluminum material having identical cross sections. End frame members 34 and side frame members 36 may be joined at the corners by a mitre joint as at 37 and by exterior right angle clips 38 secured to the frame members in suitable manner. Each frame member 34 and 36 comprises a web 40 having an inwardly directed flange 41 spaced from the top edge 42 of the frame member 36. The inboard edge of flange 41 is provided with an edge portion 43 extending slightly above the top surface of flange 41 and also extending below the bottom surface of flange 41. The upper section of edge portion 43 serves as a guide and retainer for a double surfaced adhesive tape as later described and the bottom section of edge portion 43 serves as a retainer for edge margins of insulating material as later described.

Each frame member 34, 36 also includes a bottom outwardly directed peripheral flange 45 extending from the bottom portion of web 40. The bottom flange 45 is provided with a lower return portion 46 defining an inwardly opening recess 47 adapted to receive, engage, and retain edge margins of back wall 22. For this purpose, the bottom surface of flange 45 is provided with a shoulder defining a longitudinal edge 48, and the upper surface of return portion 46 is provided with a shoulder defining a longitudinal edge 49 in slightly lateral spaced relation to the edge 48. Before assembly, return portion 46 is extruded with portion 46 provided with a substantially greater angle to flange 45 as illustrated by phantom lines in FIG. 3. Upon assembly of the frame members with the back wall 22, return portion 46 is crimped and pressed into the position shown in FIG. 3 and in gripping engagement with edge margins 57 of back wall 22.

Parallel to and spaced from web 40 and along upper and lower portions of said web 40 are a depending top rib 52 and an upstanding bottom rib 53 which define longitudinally extending recesses 54 and 55, respectively, adapted to strengthen said frame members and also to serve as a convenient mounting means for mounting and securing clip members or brackets for the collector 20 as later described.

Back wall 22 may be made of a suitable sheet of aluminum having a width and length sufficient to provide edge margins 57 which extend into recesses 47 and which are clamped and secured as by the above-described return portion 46. Back wall 22 is further secured and retained in sealing relationship with frame members 34, 36 by structural adhesive sealant 59 of silicone type which is injected into the opening between the back wall margins 57 and the lower surfaces of flange 45 inwardly of the shoulder defining the longitudinal crimping edge 48. Adhesive sealant 59 extends continuously around the inner periphery of the frame 21. The sealant 59 is also applied to the internal joint edges of the mitre joints 37 to effectively seal the assembly of wall 22 and end and side frame members 34 and 36.

Frame 21 also includes a plurality of spaced U section cross rib members 62, in this example, three of such members 62 being shown. The center member 62 is positioned at approximately the longitudinal center of collector panel 20 and the other two members 62 are positioned in somewhat closer spaced relationship to the end frame members 34 than to the center cross rib member 62. Each cross rib member 62 includes a bottom wall 63, upstanding side parallel walls 64, each wall 64 being extruded with a C section 65 adapted to receive metal securement screws inserted therein through web 40 of the side frame members 36. Bottom wall 63 may also be bonded to back wall 22 by suitably spaced applications of a bonding adhesive 66. Back wall 22 of relatively thin aluminum sheet material is thus structurally joined to frame 21.

Side walls 64 of cross rib members 62 also include inwardly directed longitudinally extending portions 67 to retain a plurality of longitudinally spaced nylon clip members 70 which serve to retain coil assembly 23 in position and in assembly with the frame 21. Clip member 70 is illustrated in FIG. 6 and is of U section having upstanding wall portions 71 terminating in outwardly directed edge portions 72 and inwardly directed edge portion 73 of thicker material section at wall 71. Outer edge portion 72 is provided with a curved edge 74 at one end thereof, the edge portion 72 on the oposite wall 71 being provided with a similar curved edge 74 at the diagonally opposite end of the clip member. The overall width of clip member 70 at the edge portions 72 is approximately the dimension of the spacing of inner surfaces of walls 64 of the cross rib member 62. The oppositely diagonally arranged curved edges 74 permit first, longitudinal installation of the clip members through the opening between inwardly directed flanges 67 of member 62, and second, turning of clip 70 into a transversely disposed relation with cross rib member 62 so that the clip member frictionally engages walls 64 immediately beneath the inwardly directed flanges 67. The inner edge portions 73 of clip members 70 are provided with convex surfaces 75 to facillitate assembly of the coil assembly 23 with the frame 21 as later described. Clip member 70 is preferably made of a nonmetallic and chemical resistant material and serves to assure that no metallic or thermally conductive contact is made between coil assembly 23 and frame 21.

The solar absorber and coil assembly 23 is best seen in FIG. 2, 3, and 4. Assembly 23 comprises a plurality of longitudinally extending solar blades 80 made of extruded aluminum material. Each blade 80 comprises a center longitudinally extending generally semicircular portion 81 having an inner radius approximately that of the outer radius of copper tube 24. Semicircular portion 81 may terminate in longitudinally extending slightly diverging leg portions 82 adapted to rest upon the top face of a cross member 83. Each blade 80 includes blade walls 85 and 86 extending laterally from the semicircular portion 81 and approximately the same width. Laterally extending wall 85 terminates in a downwardly offset longitudinal edge portion 87, the bottom surface of portion 87 lying in the same plane as the bottom of the leg portions 82. Laterally extending wall 86 also terminates in a downwardly offset longitudinal edge portion 88, the plane of edge portion 88 being spaced above the plane of the bottom edge 89 of the offset portion a sufficient distance to receive therebeneath in overlapping relation edge portion 87 of an adjacent blade 80.

In FIG. 2, copper coil 24 follows a continuous serpentine path along one line of blades 80 to the adjacent line of blades 80. Each longitudinal section of coil 24 is contained within semicircular portion 81 of associated blade 80. Each longitudinal section of coil 24 thus contained is inclined downwardly so that liquid passing through the coil 24 may drain by gravity. Since blades 80 are extruded and edge portions 87, 88, are provided with parallel edges such downward inclination of the coil 24 within the semicircular portion 81 is permitted by the relatively wide range of overlap provided between edge portions 87 and 88 of adjacent blades 80. In FIG. 3, the edge portions 87 and 88 are indicated in close relation, however, at the opposite end of such adjacent blades 80 the space between the longitudinal edge of portion 88 and the offset portion defining edge portion 87 of the adjacent blade may be spaced apart as much as half of the width of the edge portions. Thus, inclination of the longitudinal sections of coil 24 is readily provided.

Each longitudinal section of coil 24 received within the semicircular portion 81 of blade 80 is pressed therein after first coating the surfaces of semicircular portion 81 with a heat or thermally conductive material so that continuous effective heat transfer may occur between the blade 80 and the coil 24. Such heat sink material which serves as a thermal conductor also serves as a dielectric separator between the aluminum blade 80 and the copper tube 24. An example of such a dielectric thermal conducting compound is a compound identified as G641 made by Silicone Products Division of General Electric Company for facilitating heat disipation by filling voids and gaps between mating surfaces and which has an operating temperature of from minus 65 degrees F. to 400 degrees F. (minus 55 C. to 204 C.).

A plurality of transversely arranged parallel spaced cross members 83 support and interconnect the plurality of blades 80 and the copper tubing 24. Cross members 83 are spaced the same distance apart as cross rib members 62 of frame 21 and are aligned and in registration with cross members 62. After the inclination of copper tube 24 and blade 80 has been determined and fixed, the blades 80 may be secured to cross members 83 by spaced rivets 92 which extend through longitudinal edge portions 87 and 88 of end and adjacent blades 80 and through transverse wall 93 of member 83. Wall 93 has a width approximately that of the maximum width of cross rib member 62 and is provided with downwardly extending parallel walls 94 spaced apart a distance less than the opening between the inner flange portions 73 of the nylon clip member 70. The lower ends of walls 94 are provided with upwardly and outwardly inclined longitudinal retaining flanges 95. In assembly, the inclined bottom surfaces of flanges 95 are adapted to slide against the curved inner portion 73 of clip member 70 and readily pass there beneath as by a snap-on type securement assembly. In FIG. 4, it should be noticed that the lower edges of walls 94 are spaced from clip member 70 and that the lower surfaces of the laterally extending sections of wall 93 are also spaced from the top surfaces of cross rib member 62.

Such spacing between portions of the interleaved interconnecting cross rib members 62 and cross members 83 is provided by a blanket of insulating material 97 which provides insulation between frame 21 which is at ambient temperature and coil assembly 23 which is thermally heated by the sun. The blanket 97 may comprise any suitable installation having a maximum R factor for the thickness of the material used and preferably a low binder fiberglass such as Owens-Corning HT-26. Dimensionally, the blanket of insulating material 97 slightly exceeds the width and length of the frame 21 so that peripheral portions 98 of the blanket may be turned up and against the interior surface of the webs 40 of the frame 21 and confined within the space between web 40 and downturned portion 43 of upper flange 41 of frame members 34 and 36. To suitably retain the upturned peripheral portions 98 of blanket 97 a scrim fabric 99 may be applied to the upper surfaces of the blanket material in sufficient width to extend underneath flanges 41 and underneath the longitudinal edge portions 87 of blade 80 as well as opposite ends of blade 80 and end header plates 90.

Each blade 80 is painted on its top surface with a solar black absorbing paint such as Martin 23 solar black Whittaker Polyceram Paint. At opposite ends of the assembled blades 80, plates 90 may be secured to adjacent portions 87, 88 of adjacent blades as by rivets 91, FIG. 7. The exposed top surface of end plates 90 may be similarly painted. It will be noted that end turns of copper tubing 24 rest upon the top surface of end plates 90 and are in heat transfer relation therewith.

In assembly of coil assembly 23 with frame 21 and to obtain proper positioning of the coil assembly within the frame 21, a clip member 70 may be inverted and placed at each end of each cross rib member 62 adjacent to webs 40 of the frame members. Clip members 70 are of such a length that inner edges of inverted clips will serve as stops for lateral orientation of the coil assembly with frame 21. Longitudinal orientation of coil assembly 23 with frame 21 is provided by the alignment and registration of the cross rib members 62 and cross members 83.

In assembly of frame 21 with the coil assembly 23 and after the cross rib members 62 have been secured with the nylon clip members 70 suitably located in the cross rib members 62, the blanket of insulating material 97 may be laid over the entire upwardly facing opening of frame 21 and completely covers the cross rib members 62 and margins extend upward beneath flanges 41.

Scrim fabric 99 is placed over the margins. Coil assembly 23 with blades 80 and tubing 24 secured to cross members 83 may be first guided longitudinally out of alignment with the frame 21 to permit insertion of the tube ends 25, 25', into and through openings in one end frame member 34. The coil assembly is then moved longitudinally until the cross members are in alignment and the entire coil assembly placed on the blanket of insulating material. The coil assembly 23 is then pressed or lightly hammered as by a soft mallet into assembled position with frame 21 in which the walls 94 are received within clip members 70 and cross rib member 62, such depending walls 94 displacing and pressing against, and in some instances, through the insulating blanket. Thus at the internal connection of cross members 83 and 62, thermal insulation is provided between the assembled frame 21 and the coil assembly 23. It will be understood from the above description that the coil assembly is vertically supported and floats on the insulating blanket 97 and thus is free to expand and contract without contact with or stressing frame 21.

Plate 26 of light transmitting material preferably is made of a tempered glass of suitable thickness for the size of the solar collector. Plate 26 is assembled with and secured to frame 21 by first placing a double faced adhesive tape 102 of suitable width on the top surface of flange 41, the inner edge of said tape being positioned against the upper section of edge portion 43. A suitable double faced tape may be made of a vinyl foam sealing tape one-half inch wide and one sixteenth inch thick, sold as Norseal V982 manufactured by Norton Sealant Operations of Glenville, N.Y. Plate 26 is supported and retained in alignment and registration with the frame 21 by tape 102 and during application and curing of a structural adhesive sealant 103 into the spaces between the peripheral edges of plate 26, the inner face of the top portion of web 40 and the upper surface of flange 41. Adhesive sealant 103 provides a structural bond between plate 26 and frame 21. A suitable adhesive sealant is General Electric 1297 structural silicone which is adapted to be face tooled to provide a top surface lying in the same plane as the top face 42 of frame 21 and the top surface of plate 26. Adhesive sealant 103 structurally bonds plate 26 to the frame, which bonding together with the bonding of the aluminum back walls to the bottom flange 45 of the frame by the adhesive sealant material 59 of the same type provides a rigid stress-skin construction. Such structural adhesive sealant such as 59 and 103 is capable of yielding without loss of bonding to withstand static structural loading and dynamic wind loading without use of a structual metal retaining element.

Coil ends 25 and 25' which extend through ports 101 in one of the end frame members 34 may be supported and sealed in said openings 101 by suitable rubber or polymeric grommets having a configuration permitting their installation from the exterior of frame 21 and snapping into engagement with circumferential edges of ports 101. Such grommets are not shown since they are well known in the art.

The solar collector 20 described above provides a rigid rectangular structural panel member in which the solar absorber and coil assembly 23 absorbs heat from the sun through plate 26 and transfers such heat through coils 24 to a suitable fluid, such as water, passing through the coil. The assembly of the frame 21, back wall 22, and plate 26 is substantially sealed. However, in use pressure and temperatures within the solar collector vary because of heating during the day to 200 or 350 degrees F. and cooling during the night to ambient temperatures which may be freezing or less than 32° F. Under such varying conditions even though the blanket of insulating material is of a low binder type some amount of off-gasing occur and some humidity may be present within the collector, both of which may tend to cause fogging on the under surface of plate 26 and thus reduce the transmission of solar energy therethrough.

To reduce fogging and to exhaust such offgasing removable desiccant means 32 is provided at one end of the solar collector. In one end frame member 34 a rectangular opening 110 is provided opposite a space between coil end turns and at a height approximately that of the adjacent end plate 90. Desiccant means 32 comprises a rectangular plate 112 having a length and width greater than opening 110. On the internal surface of plate 112 are attached in any suitable manner a pair of jawlike grasping members 113 each comprising a base jaw element 114 and an upper jaw element 115 having downwardly and outwardly inclined gripping portion 116. Within the recess formed by elements 114, 115 and partially closed by gripping edge portion 116 may be inserted and secured one of the edge margins of a rectangular desiccant bag or envelope 118. The dessicant contained within envelope 118 may be a silica gel manufactured and sold under the name "Huma-Sorb" manufactured by the Desiccant Division of Culligan of San Bernardino, Calif. The bag or envelope is porous. Extending within the desiccant containing bag 118 is a breather tube 119 which may be sealed at its entry into bag 118 and which projects through plate 112 and may be sealed at the opening in plate 112 therefore by a suitable grommet 120. The outer end of tube 119 may be bent downwardly as at 121 to prevent dirt and foreign material from entering the tube.

When the desiccant means 32 is assembled with the solar collector the internal face of plate 112 may be covered with a double-surfaced foam gasket 123, said gasket serving to seal against the margins of opening 110 as at 124. The assembled plate 112, gasket 123 and desiccant container bag 118 with tube 119 therein may be inserted through opening 110 through a slit-like opening provided in insulating blanket 98 so that the bag 118 will rest upon the adjacent end plate 90 between adjacent coil turns of tube 24.

It will be apparent that as the solar collector is heated as during the daytime the temperature and pressure of the air within the collector will cause a portion of the air to be exhausted through the desiccant material and through the tube 119. Any moisture or humidity within the collector is thus passed through the desiccant material which adsorbs the moisture. When the solar collector cools and the temperatures and pressures within the collector are reduced, ambient air is drawn into tube 119 and is subjected to dehumidification and removal of dust by the desiccant material and process bag before entering the interior of the collector. Thus, in one cycle, warm dry air from within the collector serves to regenerate the desiccant as the air is exhausted through tube 119 and during the cooling phase the outside ambient air is dried by the desiccant material and dust entry reduced by the filtering effect of the desiccant envelope. Condensation of moisture within the collector and on the interior surface of plate 26 is not desirable and the breathing desiccant means prolongs the life of the collector unit by substantially reducing the presence of moisture and dust in the collector unit.

It will be understood that in time the silica gel of the desiccant material will become saturated with moisture. When this occurs the desiccant means 32 may be readily removed by breaking the seal of the double-faced adhesive tape 123 with web 40 and removing the desiccant bag 118. A new bag of desiccant can be readily reassembled with the gripping jaws of the desiccant holder and then reinserted into the collector.

It will be understood that the solar collector 20 may be mounted in any suitable manner upon a supporting surface or roof surface. In FIG. 5 the collector 20 may be secured and attached to a supporting surface member 130 by an arrangement of clamp members generally indicated at 27. In such mounting of collector 20 a base clamp member 132 provides an elongated rectangular portion 133 having at its outer end an upturned lip 134. Rectangular portion 133 extends underneath a major portion of the flange 45. On top of base clamp member 132 is positioned an upper clamp member 136 having a central offset portion 137 to provide clearance for the outer edge of bottom peripheral frame flange 45. Offset portion 137 is connected to a downwardly facing U portion 138 adapted to receive lower exterior rib 53 on the frame member. At the opposite end of clamp member 136 a depending rib 139 is positioned inwardly of upstanding lip 134 of the base clamp member. A suitable securing bolt 140 extends through clamp member 136 and an aligned opening in the base member 132 for securement by suitable nut (not shown) to the support surface member 130. As bolt 140 is drawn tight it will be apparent that the clamp 136 firmly secures the frame 21 to supporting member 130. In this example four of such clamps means 27 are illustrated in spaced relation along side frame members 36. Longitudinal adjustment of the clamp members is readily accommodated by the reception of the longitudinally extending rib 53 within the inverted U-shaped end 138 of clamp 136.

In another example of installing solar collector panel 20 of this invention to a supporting inclined surface or roof, mounting means 30 are provided for adjustably positioning collector 20 at the most effective angle of inclination in view of the geographical location of the collector unit and also to accommodate the changing path of the sun during different times of the year.

Mounting means 30 may comprise a U section foot member 150 secured to supporting surface member 130' by a suitable bolt and nut assembly 151. Foot member 150 carries adjacent its upper end a transverse pivot bolt 152. Bracket member 153 includes a C-section end 154 which receives bolt 152 for pivotal movement thereabout. Bracket member 153 is provided with an approximately 45 degree angle portion 155 which terminates in a right angle depending element 156 receivable and engageable within recess 55 of frame member 36. To secure member 153 on frame member 36 an angle clip 157 is seated on angle portion 155 with its edge in abutment with a shoulder on bracket member 153 as at 158. The other leg 159 of bracket 157 extends into the upper recess 54 of the frame member 36. A securement nut and bolt assembly 160 retains the angle bracket 157 on bracket member 153.

A similar bracket assembly is provided on the uppermost frame member 36 as shown in FIG. 12 and since the bracket means is identical to that described in FIG. 10 like reference numerals are applied to like parts of the bracket member 153 in FIG. 12. In the upper bracket means a pivotal connection is provided with a pivot bolt 152 carried by slideable clamping shoe means 163 formed of two shoe members 164—164 as shown in FIG. 13. Shoe means 163 is carried by an upstanding channel section strut 165 having side walls 166. Each shoe member 164 comprises a rectangular body having ports for reception of the pivot bolt 152 and at the opposite end of the shoe member provided with an inwardly directed return lip 168 forming a recess 169 which receives the longitudinal edge portions of walls 166 of strut 165. The inboard surfaces of each shoe member 164 includes transverse ridge-like contact sections 170, 171 and a contact corner 172 within the recess 169. When shoe means 163 is adjusted to a selected position on strut 165, tightening of the nut and bolt assembly 152 draws the contact points 170, 171 and 172 into tight engagement with the strut 165 and with the bracket member 153 to secure the shoe means on strut 165 at a selected position with collector 20 positioned at a desired angle of inclination.

Strut 165 is pivotally mounted at a pivot nut and bolt assembly 175 on a U-section foot member 176 secured to a supporting surface member 130' by a suitable nut and bolt assembly 177.

Mounting means 30 thus comprises three pivotal connections at 152, 175 and at 152' so that strut 165 may be varied in its upright position to selected angles and the sliding shoe means 163 moved therealong to position the collector 20 in its desired position inclination.

Installation of solar collectors at a selected site may often be done prior to completion of other work and prior to the time when solar energy can be utilized for purposes of heating water or other various uses for which a solar collector unit might be desired. In some instances the installed non operating solar collector may be exposed before use to varying weather conditions for a substantial period of time such as three to six months. In such inoperative condition without a fluid passing through the copper coil to remove collected energy the unit may become very hot and reach temperatures beyond its normal operating temperature. Under such excessive heat conditions considerable off-gassing may occur from the materials within the substantially sealed collector unit including off-gassing from the binder of the insulating material, humidity carried by different materials in the collector unit, and various other heat induced reactions. Under such excessive heat conditions the interior surface of the light transmitting plate 26 may become clouded and thereby reduce its effectiveness when the collector unit is finally connected to the remainder of the system using solar energy. Further the exterior surface of plate 26 may be damaged by changing atmospheric conditions or workmen and their materials. The effective life of a solar collector unit exposed to the sun's energy when inoperable may be reduced.

The solar collector of the present invention contemplates covering plate 26 with a protective sheet 180 of a suitable releasable material resistant to the transmission of solar energy thru plate 26 therebeneath so that absorption of heat by the absorber coil assembly 23 beneath the protective cover will be substantially reduced. The presence of the protective cover also protects the exterior surface of plate 26 from scratching, pitting, staining, or other deterioration of the glass surface caused by weather conditions and foreign matter in the ambient air. Protective covering 180 has an adhesive surface for application against the glass 26 of a type which is readily releasable and peelable without damage to the glass surface when the collector is placed in operating condition.

It will be understood that various modifications and changes may be made in the solar collector described above which may come within the spirit of this invention and all such changes and modifications coming within the scope of the appended claims are embraced thereby.

I claim:

1. In a solar collector, the improvement comprising:
   an extruded aluminum rectangular frame having a peripheral inwardly directed flange adjacent the top edge of the frame, and having a bottom outwardly directed peripheral flange provided with a return portion therebeneath defining an inwardly opening peripheral recess;
   a plate of light transmitting material having peripheral margins supported by said inwardly directed flange with the top surface of the place lying in substantially the same plane as the top edge of said frame;
   a backwall of aluminum sheet material having peripheral margins received within said inwardly opening peripheral recess of said bottom flange;
   an adhesive structural bonding material between peripheral edges of said plate and the top of said frame and inwardly directed flange for bonding and structurally securing said plate to the frame;
   an adhesive structural bonding material between the peripheral upper surface of said backwall margins and the bottom surface of said bottom flange and structurally joining said frame and said backwall margins;
   said return portion on said bottom flange below said said backwall margins being adapted for crimping engagement with said backwall margins;
   said structural peripheral bonding of said plate and said backwall to said rectangular frame providing a rigid boxlike collector stress-skin structure.

2. In a solar collector, the improvement comprising:
   an extruded aluminum rectangular frame having a peripheral inwardly directed flange adjacent the top edge of the frame;
   a plate of light transmitting material having peripheral margins supported by said flange with the top surface of the plate lying in substantially the same plane as the top edge of said frame; and
   an adhesive sealant material between the peripheral edges of said plate and the top of said frame for bonding and securing the plate to the frame;
   a back wall of aluminum sheet material;
   said rectangular frame having a bottom outwardly directed peripheral flange provided with a return portion therebeneath defining a peripheral recess opening inwardly and receiving peripheral margins of said back wall;
   means on said bottom flange for crimping engagement with said back wall margins;
   an adhesive sealant bonding said back wall margins to said bottom flange and sealing the bottom joint lines made by said frame and back wall;
   said bonding of said plate and said back wall to said rectangular frame providing a rigid collector structure;
   a solar absorber and coil assembly between said plate and said back wall;
   and means to position and retain said coil assembly within said frame;
   said means for positioning and retaining said coil assembly in said frame including
   a plurality of generally U-shaped cross rib means secured to said frame and bonded to said back wall;
   a plurality of generally U-shaped cross members on said coil assembly;
   said cross members having clip engagement means depending therefrom;
   and a plurality of spaced clip members positioned within said U-shaped cross rib means whereby said coil assembly is adapted to be snapped into assembled relation with said frame and back wall.

3. In a solar collector as stated in claim 2 including
   a blanket of insulating material between said coil assembly and said frame and the back wall, including between said cross rib means and said cross member and clip members whereby metal to metal contact between said coil assembly and said frame and back wall is avoided.

4. In a collector as stated in claim 2 including
   clip means at ends of said cross rib means for lateral positioning of said coil assembly.

5. In a solar energy collector unit, the combination of:
   a rectangular frame;
   a backwall bonded and sealed to said frame;
   a light transmitting plate bonded and sealed to said frame in spaced relation to said backwall;
   a solar absorber means located between said backwall and plate within said frame;
   a blanket of insulating material between said absorber means and said backwall;
   a means laterally and longitudinally positioning said solar energy absorber means with respect to said frame without metal to metal contact between said frame, backwall, and said absorber means;
   said positioning means including transversly arranged cross rib means secured to said frame to said backwall;
   correspondingly spaced cross members carried by said absorber means;
   and means provided on said cross rib means and on said cross members engageable in snapping relation through said insulating material.

6. In a collector means as stated in claim 5 wherein said means on said cross rib means includes
   non-metallic clip members positionable in spaced relation along each cross rib means.

7. A collector means as stated in claim 6 wherein said clip members are made of nylon.

8. A collector unit as stated in claim 6 wherein said clip members are of U-section;
   and additional clip members located at ends of said cross rib means and inverted for laterally positioning said absorber means during assembly with said cross rib means.

9. In a solar collector having a receptacle, a solar absorber means therewithin, and a light transmitting plate thereon; the provision of:
   an opening in said receptacle;
   a removable desiccant means received within said opening and provided with means for sealing said opening;
   said desiccant means including a breather tube having one end in desiccant material in said desiccant means and having its other end external of said receptacle for air communication between the interior of said receptacle through the desiccant material and the ambient air;
   said desiccant means including
   a porous bag of desiccant;

and means for releasably gripping said bag.

10. In a solar collector having a receptacle with sidewalls, a solar absorber means therewithin, and a light transmitting plate thereon; the provision of;
an opening in the sidewalls of said receptacle;
a removable dessicant means receivable within said opening and provided with means for sealing said opening;
said dessicant means including a breather tube having one end in dessicant material in said dessicant means and having its other end external of said receptacle for air communication between the interior of said receptacle through the dessicant material and the ambient air;
said dessicant means including a porous bag of dessicant;
means releasably gripping said bag;
a cover plate covering said opening and frame margins adjacent to said opening and connected with said releasable gripping means; and
a double faced adhesive sealing gasket between said cover plate and said frame margins.

11. In a collector means comprising a rectangular frame provided with a backwall and spaced light transmitting plate, both wall and plate being structurally bonded and sealed to said frame, a solar energy absorber means located between said backwall and light transmitting plate within said frame, a blanket of insulating material between said absorber means and said backwall including, the combination of:
attachment means on said rectangular frame comprising external juxtaposed spaced ribs providing parallel recesses at least at ends of said rectangular frame;
and bracket means comprising a bracket element having a depending edge portion at one end receivable in one of said juxtaposed recesses and having a pivotal mounting at its other end
said bracket element having a seating surface,
a bracket angle clip seated on said seating surface with one leg of said angle clip extending into the other of said recesses,
and a securement member extending through the other leg of said clip and said bracket element for releasably retaining said bracket means in assembly with said frame.

12. A collector means as stated in claim 11 including means for adjustably inclining said rectangular frame means relative to a support structure comprising,
an upstanding strut member having spaced longitudinal walls and having a pivotal connection to said support structure;
a slidable means on said strut member having a pivotal connection to said pivotal mounting means of said bracket member; said slidable means including
a pair of spaced shoe elements carried at opposite ends of the pivotal mounting means, each shoe element comprising a wall having a return lip providing a recess to receive longitudinal edge portions of said strut walls,
said pivotal mounting means including a nut and bolt assembly extending through said spaced shoe elements and tightenable to clampingly engage said shoe elements with said strut walls.

13. In a method of assembling a solar collector for thermal isolation of a frame and back wall providing a receptacle in contact with ambient temperature and a solar absorber and coil assembly within the receptacle and adapted to receive and be heated by solar energy transmitted thereto through a light transmitting plate, the steps of:
positioning and securing nonmetallic, insulating clip members in said receptacle;
providing clip engagement means on said coil assembly;
interposing a blanket of insulating material between said coil assembly and the interior of said receptacle including said insulating clip members;
placing said coil assembly over said blanket of insulating material;
and pressing said coil assembly toward said receptacle to cause engagement of said clip engagement means and clip members with said insulating blanket therebetween.

14. In a method as stated in claim 13 including the step of
laterally positioning said coil assembly in said receptacle by inverted clip members adjacent said frame.

15. In a method as stated in claim 13 including the steps of:
bonding said back wall to said frame;
and bonding edges of said light transmitting plate to said frame.

* * * * *